(12) United States Patent
Anderson

(10) Patent No.: US 6,509,899 B1
(45) Date of Patent: Jan. 21, 2003

(54) TIME DIFFERENCING FOR IMPROVED CLOTH ANIMATION

(75) Inventor: John R Anderson, San Anselmo, CA (US)

(73) Assignee: Lucas Digital Ltd., San Rafael, CA (US)

( * ) Notice: Subject to any disclaimer, the term of this patent is extended or adjusted under 35 U.S.C. 154(b) by 0 days.

(21) Appl. No.: 09/516,330

(22) Filed: Mar. 1, 2000

Related U.S. Application Data

(60) Provisional application No. 60/122,195, filed on Mar. 1, 1999.

(51) Int. Cl.$^7$ .............................................. G06T 15/00
(52) U.S. Cl. ...................................................... 345/473
(58) Field of Search ................................ 345/473, 424, 345/474, 701

(56) References Cited

U.S. PATENT DOCUMENTS

| | | | |
|---|---|---|---|
| 6,121,864 A | * | 9/2000 | Madden et al. ............. 345/473 |
| 6,141,019 A | * | 10/2000 | Rosebough et al. ........ 345/473 |
| 6,246,420 B1 | * | 6/2001 | Mochizuki et al. ......... 345/474 |
| 6,300,960 B1 | * | 10/2001 | DeRose et al. ............. 345/474 |
| 6,342,886 B1 | * | 1/2002 | Pfister et al. ............... 345/424 |
| 6,369,834 B1 | * | 4/2002 | Zilles et al. ................ 345/701 |

OTHER PUBLICATIONS

The Simulation of Three–Dimensional Convective Storm Dynamics; Joseph B. Klemp et al.; Journal of the Atmospheric Sciences, vol. 35, Jun. 1978, pp. 1070–1096.

\* cited by examiner

*Primary Examiner*—Mark Zimmerman
*Assistant Examiner*—Huedung X. Cao
(74) *Attorney, Agent, or Firm*—Irell & Manella LLP

(57) ABSTRACT

A dynamic cloth simulation technique according to the present invention decomposes the second order differential equations of motion into two first order differential equations which permits separation of position and velocity terms. In another aspect of the present invention tensile stiffness terms are separated from bending and damping terms. The bending and damping terms may be integrated using long time steps to promote simulation stability. Tensile stiffness terms may be calculated in sub-cycle periods shorter than the long time steps used for bending and damping calculations. Use of short sub-cycle steps in simulations of garments having high tensile spring forces permits a stable dynamic simulation with a high degreee of realism.

7 Claims, 1 Drawing Sheet

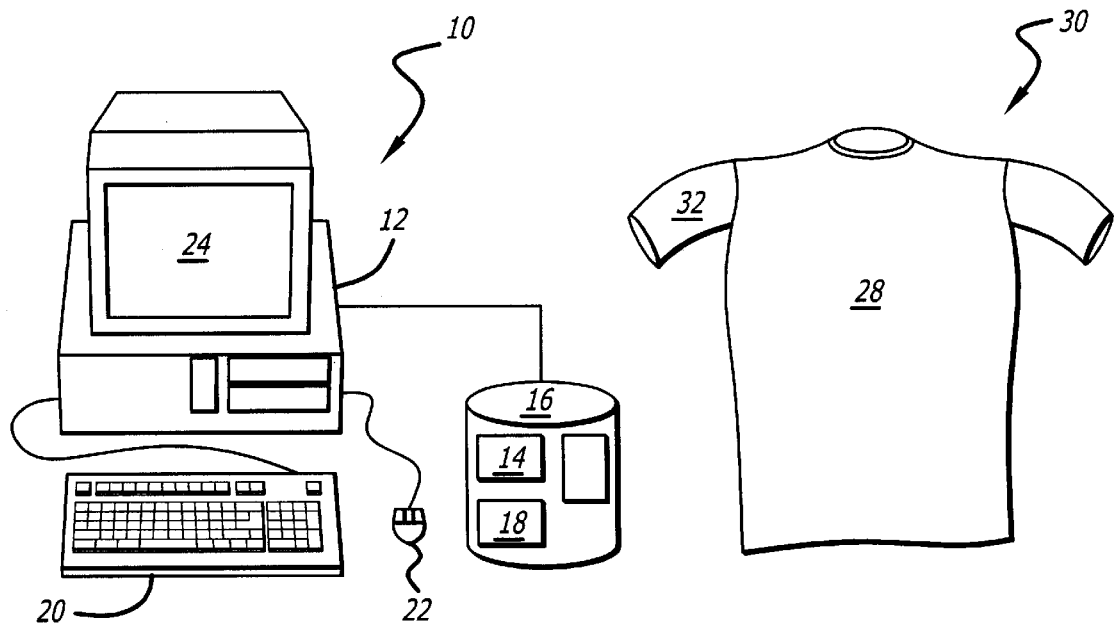
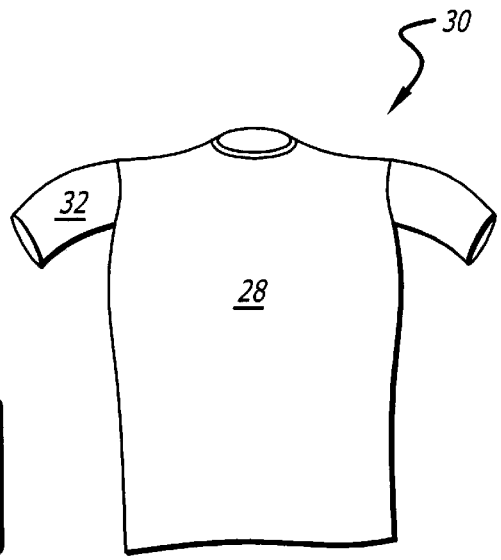
FIG. 1
FIG. 2
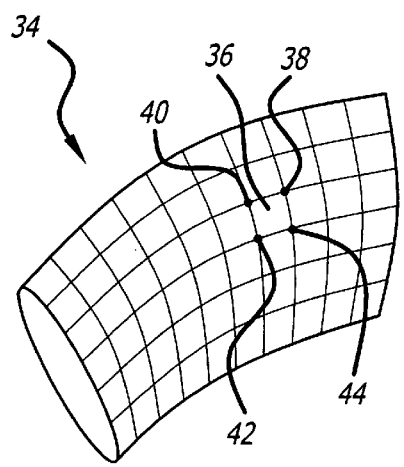
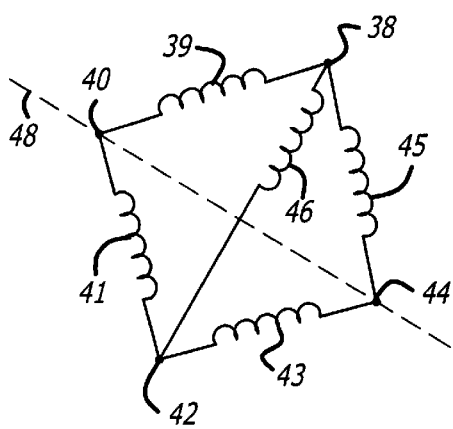
FIG. 3
FIG. 4
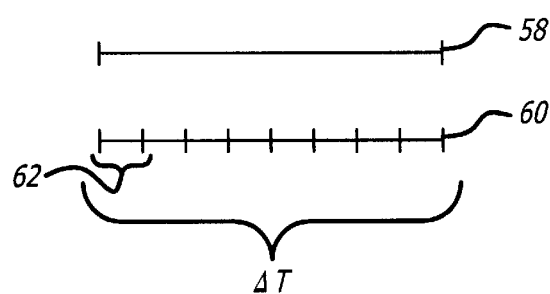
FIG. 5

TIME DIFFERENCING FOR IMPROVED CLOTH ANIMATION

RELATED APPLICATION

This application claims priority of Provisional application Serial No. 60/122,195 filed Mar. 1, 1999.

BACKGROUND OF THE INVENTION

1. Field of the Invention

This invention relates to improved techniques for simulation of fabric dynamics and more specifically to explicit time discretization techniques of the differential equations for cloth simulation.

2. Description of the Prior Art

Conventional animation has always been a labor intensive project. Having human effort create each and every image used to generate the animation allowed extensive control over how items to be animated appeared. The cost of the extensive control is paid in human labor. As more computers are used to generate animation, Human labor is minimized by using computer simulations to generate many of the frames embodying the animation.

Conventional computer simulation techniques for cloth and soft body animation are of two varieties, simple and complex. The complex techniques yield acceptable animation results but require large computational resources and may require several iterations to achieve the desired result. Simple techniques are computationally efficient and their results are crude and simple. Using simple simulation techniques may require many iterations to achieve a functional simulation from which marginal animation may be generated. What is needed is a computationally efficient simulation for cloth and soft body animation that yields realistic results.

SUMMARY OF THE INVENTION

In a first aspect, the present invention includes a new technique for time differencing the underlying differential equations involved in the simulation of fabric dynamics. This new formulation is based on the separation of the damping force terms which are derived from the relative grid velocities and the tensile and bending stiffness terms which are derived from the relative grid positions. The time integration strategy is based on the evaluation of the stiffness and damping terms to produce a new velocity state and this new velocity state is then used to update the grid geometry. This separation of terms allows the formulation of a system which displays dynamically neutral behavior for wave propagation phenomena and stable integration of the damping terms. This force separation approach results in a time integration scheme which is four times more efficient than the commonly used backwards Euler (sometimes referred to as 2nd order Runga-Kutta) scheme since it allows time steps to be twice as long with each time step having half the computational complexity. It is also twice as efficient as the leapfrog time differencing techniques which are subjects of current research without any of the mode-splitting and problems associated with leapfrog methods. When the simulation of high tensile stiffness fabrics is required the technique lends itself to the use of explicit sub-cycling where the tensile stiffness terms are integrated separately with a smaller and simpler time step than the bending and damping forces.

In another aspect, the present invention simulates motion of a flexible surface using the steps of representing the flexible surface with a polygonal mesh interconnecting a plurality of points and calculating a new position of each point of the polygonal mesh over time using a first order differential equation for position and calculating a new velocity of each point of the polygonal mesh over time using a first order differential equation for velocity.

In still another aspect, the present invention simulates motion of a flexible surface using the steps of representing the flexible surface with a polygonal mesh interconnecting a plurality of points, calculating each point's position over time using a first order differential equation employing an old position and an old velocity to determine a new position and calculating each point's velocity over time using a first order differential equation employing the new position and current velocity to determine the new velocity.

In a further aspect, the present invention simulates motion of a flexible surface using the steps of representing the flexible surface with a polygonal mesh interconnecting a plurality of points and calculating a new first characteristic and a new second characteristic of each point of the polygonal mesh over time using a first order differential equation for the first characteristic and a first order differential equation for the second characteristic.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 1 is a block diagram of a computer apparatus according to the present invention.

FIG. 2 is a 3-dimensional representation of a garment to be simulated.

FIG. 3 is a 3-dimensional close-up of a portion of the simulation mesh of the garment of FIG. 2.

FIG. 4 is a simulation element model of a polygon of FIG. 3.

FIG. 5 is a simulation time step model showing sub-cycle periods.

DETAILED DESCRIPTION OF THE PREFERRED EMBODIMENT(S)

Referring now to FIG. 1, the general architecture of a digital computer system 10 for implementing the present invention is shown. Processor 12 may be any standard digital computer processor. In a currently preferred embodiment of the present invention processor 12 is a workstation-class processor such as SILICON-GRAPHICS INDIGO2-EXTREME for interactive work, or SILICON-GRAPHICS CHALLENGE SERVERS FOR BATCH PROCESSING, running any appropriate conventional operating system such as the IRIX5.3 operating system. Although the processor 12 is shown as one unit, it will be appreciated that separate processes may be employed for interactive use and batch processing. System software 14 may be stored on storage unit 16 which may be any conventional storage device such as an internal fixed disk drive. Also preferably stored on storage unit 16 is simulation software 18 which, in accordance with the present invention, performs the dynamic simulation algorithms and manages the necessary data, as described in greater detail below. An interactive user input, where referenced below, may be provided via standard input peripherals such as keyboard 20 and/or mouse 22. Graphical output created by processor 12 under control of simulation software 18 may be transmitted to a display device such as video monitor 24 for display to users; equivalently, output may also be transmitted to a printing devices to generate hard copy output in the form of videotape, film, slides, or the like.

Referring now to FIG. 2, garment 30 is to be simulated in accordance with the present invention. For the purposes of simulation, garment 30 may be modeled by a polygonal mesh. A close-up of simulation mesh is shown in FIG. 3. Sleeve 32 of garment 30 may be represented by mesh 34. Mesh 34 may be composed of many individual polygons such as polygon 36. Polygon 36 includes and is described by points 38, 40, 42 and 44.

Referring now to FIG. 4, polygon 36 is shown in close-up including its dynamic simulation elements. Tensile stiffness of fabric such as fabric 28 may be accommodated in a dynamic simulation by springs between the corner points. For polygon 36, spring 39 is between point 38 and point 40, spring 41 is between point 40 and point 42, spring 43 is between point 42 and point 44, spring 45 is between point 38 and point 44. Restoring spring 46 controls the bending response of polygon 36 about hinge 48.

The dynamics of each point of a simulation mesh such as points 38, 40, 42 and 44 may be described by second order differential equations in terms of position and velocity as functions of time. In a currently preferred embodiment of the present invention a conventional second order differential equation may be replaced by two, coupled, first order differential equations such as equations 50 and 52 where X is the position state vector and V is the velocity vector. By converting a second order differential equation into two, first order differential equations, position and velocity of each point may be determined separately. Equation 50 is a forward looking step which uses old position, $X^t$, and old velocity, $V^t$, to determine the next position of each point $X^{t+1}$.

$$X^{t+1}=X^t+\Delta t V^t \quad \text{Equation 50}$$

Equation 52 is a backward looking step which uses new position, $X^{t+1}$, and the old velocity, $V^t$, to determine the new velocity of each point $V^{t+1}$. New velocity $V^{t+1}$ is the sum of old velocity, $V^t$, acceleration due to spring forces $\Delta t F_x(X^{t+1})$, and damping force due to old velocity $\Delta t F_v(V^t)$.

$$V^{t+1}=V^t+\Delta t F_x(X^{t+1})+\Delta t F_v(V^t) \quad \text{Equation 52}$$

Separation of position and velocity calculations cuts the computational complexity of a simulation in half compared to conventional techniques which generally compute position and velocity twice to achieve some level of dynamic stability. Additionally, time step $\Delta t$ of a dynamic simulation according to the present invention may be twice as long as that of conventional techniques owing to the improved stability of the present invention at the same level of accuracy as conventional techniques.

Explicit Sub-Cycling

When simulating motion of high tensile stiffness fabric and soft bodied objects such as garment 30, the length of time steps such as $\Delta t$ may be limited by the stability of the simulation which is a function of the strength of the simulation springs such as springs 39, 41, 43, 45 and 46. Tensile springs such as springs 39, 41, 43, 45 are generally the limiting quantities. This effect is most pronounced in stiff fabrics such as leather or kevlar.

Referring now to FIGS. 4 and 5, In a currently preferred embodiment of the present invention bending and damping forces 58 may be separated from tensile force 60. Bending and damping forces 58 such as those generated by spring 46 may be integrated over time $\Delta t$ and then held constant at the calculated value for the period of $\Delta t$. $\Delta t$ may be subdivided into sub-cycles such as period 62. tensile force 60 may then be calculated, using equations such as equations 54 and 56, for each sub-cycle such as period 62 with bending and damping forces 58 held constant.

$$X^{t0+(J+1)\Delta t}=X^{t0+J\Delta t}+\Delta t V^{t0+J\Delta t} \quad \text{Equation 54}$$

$$V^{t0+(J+1)\Delta t}=V^{t0+J\Delta t}+F_v(V^{t0})\Delta t+F_v{}'(V^{t0+J\Delta t}-V^{t0})\Delta t+F_x(X^{t0})\Delta t+F_x{}'(X^{t0+J\Delta t}-X^{t0})\Delta t \quad \text{Equation 56}$$

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following claims.

I claim:

1. A method of simulating motion of a flexible surface comprising the steps of:

representing the flexible surface with a polygonal mesh interconnecting a plurality of points;

calculating a new position of each point of the polygonal mesh over time using a first order differential equation employing an old position and an old velocity to determine the new position; and calculating a new velocity of each point of the polygonal mesh over time using a first order differential equation employing the new position and current velocity to determine the new velocity.

2. A method of simulating motion of a flexible surface comprising the steps of:

representing the flexible surface with a polygonal mesh interconnecting a plurality of points;

calculating a position of each point of the polygonal mesh over time using a first order differential equation of the form $X^{T+1}=X^T+\Delta T V^T$; and calculating a velocity of each point of the polygonal mesh over time using a first order differential equation of the form $V^{T+1}=V^T+\Delta T F_x(X^{T+1})+\Delta T F_v(V^T)$.

3. A method of simulating motion of a flexible surface comprising the steps of:

representing the flexible surface with a polygonal mesh interconnecting a plurality of points;

calculating a new position of each point of the polygonal mesh over time using a first order differential equation employing an old position and an old velocity to determine the new position;

calculating a bending and a damping force at each point of the polygonal mesh over time $\Delta T$; and calculating a tensile force at each point of the polygonal mesh over time $\Delta T/n$.

4. A method of simulating motion of a flexible surface comprising the steps of:

representing the flexible surface with a polygonal mesh interconnecting a plurality of points;

calculating a position of each point of the polygonal mesh over time using an equation of the form $X^{t0+(j+1)\Delta t}=X^{t0+j\Delta t}+\Delta t V^{t0+j\Delta t}$; and calculating a velocity of each point of the polygonal mesh over time using an equation of the form $V^{t0+(j+1)\Delta t}=V^{t0+j\Delta t}+F_x(X^{t0})\Delta t+F_x{}'(X^{t0+j\Delta t}-X^{t0})\Delta t+F_v(V^{t0})\Delta t+F_v{}'(V^{t0+j\Delta t}-V^{t0})\Delta t$.

5. A flexible surface animated by a process comprising the steps of:

representing the flexible surface with a polygonal mesh interconnecting a plurality of points;

calculating each point's position over time using a first order differential equation of the form $X^{T+1}=X^T+\Delta TV^T$; and calculating each point's velocity over time using a first order differential equation of the form $V^{T+1}=V^T+\Delta TF_x(X^{T+1})+\Delta TF_v(V^T)$.

6. A flexible surface animated by a process comprising the steps of:

representing the flexible surface with a polygonal mesh interconnecting a plurality of points;

calculating each point's position over time using a first order differential equation of the form $X^{t0+(j+1)\Delta t}=X^{t0+j\Delta t}+\Delta t V^{t0+j\Delta t}$; and calculating each point's velocity over time using a first order differential equation of the form $V^{t0+(j+1)\Delta t}=V^{t0+j\Delta t}+F_x(X^{t0})\Delta t+F_x'(X^{t0+j\Delta t}-X^{t0})\Delta t+F_v(V^{t0})\Delta t+F_v'(V^{t0+j\Delta t}-V^{t0})\Delta t$.

7. A method of simulating motion of a flexible surface comprising the steps of:

representing the flexible surface with a polygonal mesh interconnecting a plurality of points;

calculating a new first characteristic of each point of the polygonal mesh over a first time period; and calculating a new second characteristic of each point of the polygonal mesh over a second time period and the second time period is shorter than the first time period.

* * * * *